(12) United States Patent
Chetal et al.

(10) Patent No.: US 9,152,960 B2
(45) Date of Patent: Oct. 6, 2015

(54) BIOMETRIC IDENTIFICATION AND AUTHENTICATION SYSTEM

(71) Applicants: Shyam Chetal, Fremont, CA (US); William Henry Giolma, Dallas, TX (US)

(72) Inventors: Shyam Chetal, Fremont, CA (US); William Henry Giolma, Dallas, TX (US)

(73) Assignee: SHYAM CHETAL, Fremont, CA (US)

( * ) Notice: Subject to any disclaimer, the term of this patent is extended or adjusted under 35 U.S.C. 154(b) by 0 days.

(21) Appl. No.: 13/951,489

(22) Filed: Jul. 26, 2013

(65) Prior Publication Data
US 2013/0311367 A1 Nov. 21, 2013

Related U.S. Application Data

(63) Continuation-in-part of application No. 12/752,178, filed on Apr. 1, 2010, now abandoned.

(51) Int. Cl.
| | |
|---|---|
| *G06F 21/00* | (2013.01) |
| *G06Q 20/38* | (2012.01) |
| *G06Q 20/40* | (2012.01) |
| *G06K 9/00* | (2006.01) |
| *G06Q 40/02* | (2012.01) |
| *G06Q 50/26* | (2012.01) |
| *G06K 9/68* | (2006.01) |

(52) U.S. Cl.
CPC .......... *G06Q 20/382* (2013.01); *G06K 9/00892* (2013.01); *G06K 9/00973* (2013.01); *G06Q 20/40145* (2013.01); *G06Q 40/02* (2013.01); *G06Q 50/265* (2013.01); *G06K 9/6807* (2013.01)

(58) Field of Classification Search
USPC ............................................. 705/52
See application file for complete search history.

(56) References Cited

U.S. PATENT DOCUMENTS

| | | | | | |
|---|---|---|---|---|---|
| 3,840,393 | A | * | 10/1974 | Ishizaka et al. | 427/208.4 |
| 4,760,245 | A | | 7/1988 | Fukaya | |
| 4,830,893 | A | * | 5/1989 | Nakamura et al. | 428/35.8 |
| 5,258,433 | A | * | 11/1993 | Meier et al. | 524/155 |
| 5,705,588 | A | * | 1/1998 | Kreis et al. | 528/24 |
| 5,870,723 | A | * | 2/1999 | Pare et al. | 705/39 |
| 6,011,858 | A | * | 1/2000 | Stock et al. | 382/115 |
| 6,045,039 | A | * | 4/2000 | Stinson et al. | 235/379 |
| 6,081,782 | A | | 6/2000 | Rabin | |
| 6,154,879 | A | | 11/2000 | Pare, Jr. et al. | |

(Continued)

OTHER PUBLICATIONS

Jain et al. Biometric Identification, Communications of the ACM Feb. 2000/vol. 43, No. 2.*

*Primary Examiner* — Zeshan Qayyum
(74) *Attorney, Agent, or Firm* — Raj Abhyanker, P.C.

(57) ABSTRACT

Disclosed are methods, apparatus, and systems of biometric identification and authentication. In one embodiment, a method to authenticate a user at an automated teller machine is disclosed. In this embodiment, the method comprises: retrieving, by a processor of the automated teller machine, a numeric identification data inputted by the user; comparing, by the processor or by a processor of a remote sever, the numeric identification data against a stored set of numeric identification data in a user database stored in a memory communicatively coupled to the automated teller machine; and narrowing, by the processor or by the processor of the remote server, a user population to a first narrowed set of the user population based on the comparison of the numeric identification data against the stored set of numeric identification data. Multiple biometric identification techniques may then be used to authenticate the user at the automated teller machine.

20 Claims, 5 Drawing Sheets

(56) References Cited

U.S. PATENT DOCUMENTS

| | | | |
|---|---|---|---|
| 6,572,014 B1 * | 6/2003 | Lambert | 235/380 |
| 6,735,695 B1 * | 5/2004 | Gopalakrishnan et al. | 713/186 |
| 7,319,987 B1 | 1/2008 | Hoffman et al. | |
| 7,427,024 B1 | 9/2008 | Gazdzinski et al. | |
| 7,705,104 B2 * | 4/2010 | Yamakawa et al. | 528/31 |
| 7,921,297 B2 | 4/2011 | Ortiz et al. | |
| 8,279,042 B2 | 10/2012 | Beenau et al. | |
| 8,294,552 B2 | 10/2012 | Beenau et al. | |
| 8,301,564 B2 | 10/2012 | Mon et al. | |
| 8,360,322 B2 | 1/2013 | Bonalle et al. | |
| 8,392,721 B2 * | 3/2013 | Kaleedhass et al. | 713/186 |
| 8,423,466 B2 | 4/2013 | Lanc | |
| 2003/0074328 A1 | 4/2003 | Schiff et al. | |
| 2003/0080185 A1 | 5/2003 | Werther | |
| 2005/0187883 A1 * | 8/2005 | Bishop et al. | 705/67 |
| 2006/0074698 A1 | 4/2006 | Bishop et al. | |
| 2006/0136332 A1 * | 6/2006 | Ziegler | 705/39 |
| 2006/0143117 A1 | 6/2006 | Chigira et al. | |
| 2006/0171571 A1 | 8/2006 | Chan et al. | |
| 2007/0172114 A1 | 7/2007 | Baker et al. | |
| 2008/0298647 A1 * | 12/2008 | Orr et al. | 382/124 |
| 2008/0319872 A1 * | 12/2008 | Russell et al. | 705/26 |
| 2009/0076966 A1 * | 3/2009 | Bishop et al. | 705/67 |
| 2009/0105395 A1 * | 4/2009 | Kamata et al. | 524/502 |
| 2010/0111376 A1 | 5/2010 | Yan et al. | |
| 2010/0115611 A1 * | 5/2010 | Morihara | 726/19 |
| 2010/0127069 A1 | 5/2010 | Henton, Sr. | |
| 2011/0087611 A1 | 4/2011 | Chetal | |

\* cited by examiner

BIOMETRIC IDENTIFICATION AND AUTHENTICATION SYSTEM

CLAIM OF PRIORITY

This non-provisional application is a continuation-in-part (CIP) application of, and incorporates by reference in its entirety, U.S. patent application Ser. No. 12/752,178 filed on Apr. 1, 2010.

FIELD OF TECHNOLOGY

This disclosure relates generally to biometrics and, in particular, to a method, an apparatus, and a system of biometric identification and authentication.

BACKGROUND

An automated teller machine (ATM) is an apparatus used for performing a financial transaction (e.g., deposit, withdrawal, account balance check, etc.). Today's ATMs often require a user to insert a bank issued ATM card to identify and authenticate the user prior to granting the user access to the user's financial account(s). However, such an ATM card may become lost or stolen or the information on the ATM card may be compromised by identity thieves. While banks have attempted to reduce the likelihood of identity theft by requiring users to input a user-generated identification code (such as a pin code), such codes may also be compromised using keystroke logging technologies.

In addition, the user may simply forget the ATM card at home but may still desire to perform a financial transaction at an ATM. In such a situation, the user may be inconvenienced from having to return home to retrieve the ATM card or may be discouraged from performing the financial transaction completely.

SUMMARY

Disclosed are a method, an apparatus, and a system of biometric identification and authentication. In one aspect, a method to authenticate a user at an automated teller machine is disclosed. In this aspect, the method comprises: retrieving, by a processor of the automated teller machine, a numeric identification data inputted by the user; comparing, by the processor, the numeric identification data against a stored set of numeric identification data in a user database stored in a memory communicatively coupled to the automated teller machine; and narrowing, by the processor, a user population to a first narrowed set of the user population based on the comparison of the numeric identification data against the stored set of numeric identification data.

In this aspect, retrieving the numeric identification data inputted by the user may involve retrieving the numeric identification data from the memory, wherein the numeric identification data is inputted by the user through a keypad coupled to the automated teller machine and then stored in the memory before retrieval. Moreover, the numeric identification data may be a zip code of the user, a pin code of the user, and/or a phone number of the user. In addition, the stored set of numeric identification data in the user database may be a plurality of user-submitted numeric identification data indexed and stored in the user database. The user population may be a numeric data representing a pre-determined total number of users of the automated teller machine.

Additionally, the method involves receiving, at a fingerprint scanner coupled to the automated teller machine, a fingerprint of the user; storing, in the memory, a template of the fingerprint; extracting, by the processor, a first set of extracted fingerprint features from the template of the fingerprint; converting, by the processor, the first set of extracted fingerprint features to a first digital fingerprint data; and narrowing, by the processor, the user population from the first narrowed set to a second narrowed set based on a comparison of the first digital fingerprint data to a stored set of digital fingerprint data stored in the user database. Additionally, the method involves extracting, by the processor, a second set of extracted fingerprint features from the template of the fingerprint; converting, by the processor, the second set of extracted fingerprint features to a second digital fingerprint data; and narrowing, by the processor, the user population from the second narrowed set to a third narrowed set based on a comparison of the second digital fingerprint data to the stored set of digital fingerprint data.

In this aspect, the first set of extracted fingerprint features may be one of an arch, a loop, or a whorl of the fingerprint. Additionally, the second set of extracted fingerprint feature may be a pattern and a Minutia feature of the fingerprint. Moreover, the stored set of digital fingerprint data in the user database is a plurality of user-submitted digital fingerprint data indexed and stored in the user database.

In one aspect, the fingerprint scanner may be a capacitance-based fingerprint scanner. In another aspect, the fingerprint scanner may be an optical-based fingerprint scanner. In one or more aspects, the template of the fingerprint may be a live scan of the fingerprint.

Moreover, the method involves receiving, at an iris scanner coupled to the automated teller machine, an iris image of the user; storing, in the memory, a template of the iris image; extracting, by the processor, a first set of extracted iris features from the template of the iris image; converting, by the processor, the first set of extracted iris features to a first digital iris data; and narrowing, by the processor, the user population from the third narrowed set to a fourth narrowed set based on a comparison of the first digital iris data to a stored set of digital iris data stored in the user database. In addition, the method involves, extracting, by the processor, a second set of extracted iris features from the template of the iris image; converting, by the processor, the second set of extracted iris features to a second digital iris data; and narrowing, by the processor, the user population from the fourth narrowed set to a fifth narrowed set based on a comparison of the second digital iris data to the stored set of digital iris data.

In this aspect, the template of the iris image may be an image of the chromatic pattern of the iris of the user. In addition, the first set of extracted iris features may be a chromatic pattern of the stroma of the iris of the user. Moreover, the second set of extracted iris features may be a chromatic pattern of the epithelial layer of the iris. Furthermore, the stored set of digital iris data in the user database may be a plurality of user-submitted digital iris data indexed and stored in the user database.

In one aspect, the iris scanner may be an infrared-based iris scanner configured to capture an infrared image of the iris of the user. In another aspect, the iris scanner may be a digital camera configured to capture a digital image of the iris of the user.

Finally, the method involves receiving, at a camera coupled to the automated teller machine, a facial image of the user; storing, in the memory, a template of the facial image; extracting, by the processor, a first set of extracted facial features from the template of the facial image; converting, by the processor, the first set of extracted facial features to a first digital facial data; and narrowing, by the processor, the user population from the fifth narrowed set to a sixth narrowed set based on a comparison of the first digital facial data to a stored set of digital facial data stored in the user database. Moreover, the method involves extracting, by the processor, a second set of extracted facial features from the template of the facial image; converting, by the processor, the second set of extracted facial features to a second digital facial data; narrowing, by the processor, the user population from the sixth narrowed set to a seventh narrowed set based on a comparison of the second digital facial data to the stored set of digital facial data; and authenticating the user and permitting the user to access a financial account through the automated teller machine based on the comparison of the second digital facial data to the stored set of digital facial data.

In one aspect, the template of the facial image may be a digital image of the face of the user. In this aspect, the first set of extracted facial features may be a set of dimensions of the face of the user. In another aspect, the second set of extracted facial features may be a set of distances from pre-determined reference points to a center point on the face of the user.

The methods, apparatus, and systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

Other features of the present embodiments will be apparent from the accompanying drawings and from the detailed description that follows.

DETAILED DESCRIPTION

Disclosed are a method, an apparatus, and a system of biometric identification and authentication. Although the present embodiments have been described with reference to specific example embodiments, it will be evident that various modifications and changes may be made to these embodiments without departing from the broader spirit and scope of the various embodiments. It should be understood by one of ordinary skill in the art that the terms "module(s)" and "block(s)" may refer to software, hardware, or a combination thereof. For example, the software can be machine code, firmware, embedded code, application software, or a combination thereof. The hardware, for example, can be circuitry, processor(s), computer(s), integrated circuit(s), integrated circuit core(s), or a combination thereof. In addition, the components shown in the figures, their connections, couples, and relationships, and their functions, are meant to be exemplary only, and are not meant to limit the embodiments described herein.

Figure 1:
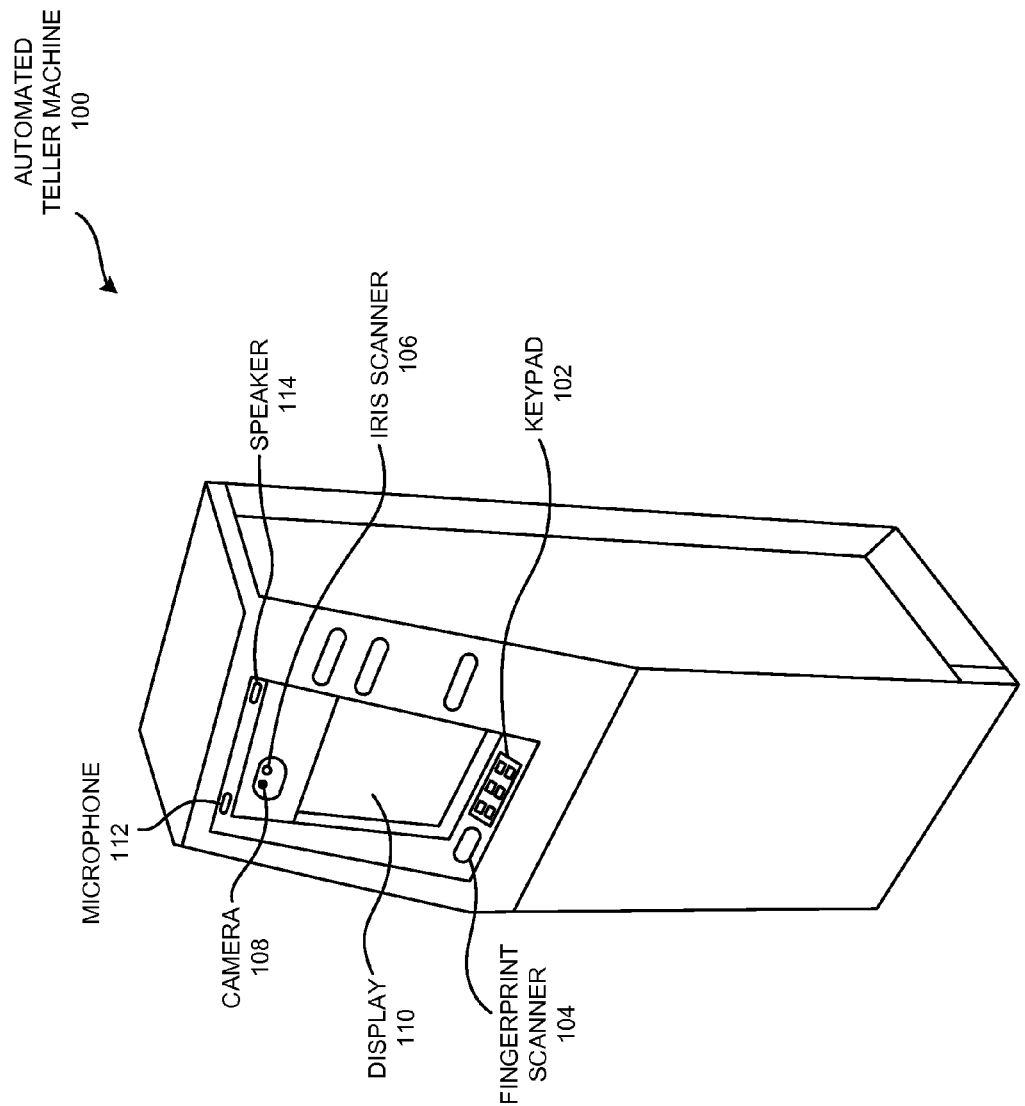
FIG. 1 is an automated teller machine configured for biometric identification and authentication, according to one or more embodiments.

FIG. 1 illustrates an automated teller machine 100 configured for biometric identification and authentication, according to one or more embodiments. As shown in FIG. 1, the automated teller machine 100 may comprise a keypad 102, a fingerprint scanner 104, an iris scanner 106, a camera 108, a display 110, a microphone 112, and a speaker 114. In one embodiment, all such components may be directly coupled to the automated teller machine 100. In another embodiment, all such components may be operatively or communicatively coupled to the automated teller machine 100 through multiple connections, interfaces, and/or buses. In addition to such components, the automated teller machine 100 may comprise a magnetic card reader, a cryptoprocessor, a fund dispensing mechanism, a fund accepting mechanism, a record printer, a secure vault, and one or more sensors and/or light indicators. In addition, the automated teller machine 100 may run an operating system such as a Windows® operating system or a Linux operating system. In one embodiment, the keypad 102 may be an encrypting PIN pad. In another embodiment, the keypad 102 may be an alphanumeric keyboard. In yet another embodiment, the keypad 102 may be a capacitance-based touchpad presented through the display 110 of the automated teller machine 100.

In one embodiment, the fingerprint scanner 104 may be a capacitance-based fingerprint scanner known to one of ordinary skill in the art of biometrics. In another embodiment, the fingerprint scanner 104 may be an optical-based fingerprint scanner known to one of ordinary skill in the art of biometrics. In this embodiment, the optical fingerprint scanner may comprise a charge coupled device having an array of light sensitive diodes. The light sensitive diodes may generate a scan of a fingerprint comprising of light and dark pixels. In addition, the fingerprint scanner 104 may also comprise an analog-to-digital converter to convert analog electrical signals received by the light sensitive diodes into a digital representation of the fingerprint.

In one embodiment, the iris scanner 106 may be an infrared-based iris scanner configured to capture an infrared image of the iris of the user. In this embodiment, the infrared-based iris scanner acquires an image of the iris at near infrared ranges of 700-900 nm. The near infrared spectrum may reduce iris pattern contamination by blocking corneal reflections from ambient light. In another embodiment, the iris scanner 106 may be the camera 108 of the automated teller machine 100 depicted in FIG. 1. In this embodiment, the camera 108 may capture an image of the user's iris at a visible wavelength. In addition, the camera 108 may be a digital camera comprising the type of charge coupled device described above.

In one or more embodiments, the camera 108 may also be used to capture a digital image of the face of the user. In one embodiment, the camera 108 may be positioned at a downward angle to the face of the user. In another embodiment, the camera 108 may be positioned at an upward angle to the face of the user. In a further embodiment, the camera 108 may be positioned to a side of the user's face and may take a side profile image of the user.

In one embodiment, the automated teller machine 100 may automatically detect the presence of the user by detecting a face of the user using the camera 108. In another embodiment, the automated teller machine 100 may automatically detect the presence of the user by detecting a sound through the microphone 112. In one or more embodiments, the automated teller machine 100 may provide instructions to the user through the speaker 114. In these or other embodiments, the automated teller machine 100 may provide written instructions to the user through the display 110. In one or more embodiments, the templates of the fingerprint, iris, and/or facial features of the user may be presented to the user through the display 110.

Figure 2:
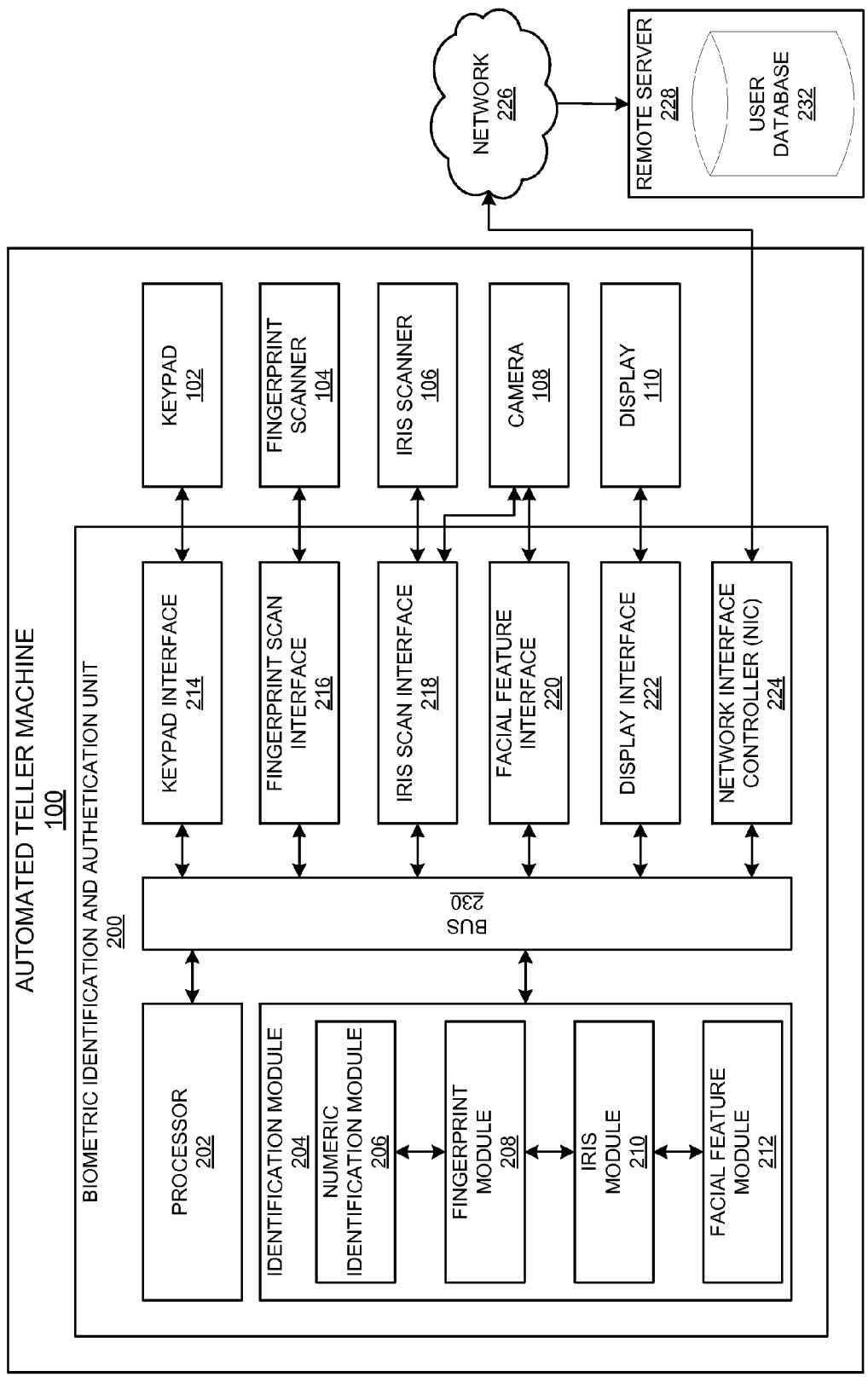
FIG. 2 is a block diagram illustrating the components of the automated teller machine of FIG. 1, according to one or more embodiments.

FIG. 2 is a block diagram illustrating the components of the automated teller machine 100 of FIG. 1, according to one or more embodiments. As shown in FIG. 2, the automated teller machine 100 may comprise a biometric identification and authentication unit 200. In the example embodiment shown in FIG. 2, the biometric identification and authentication unit 200 may be coupled to the keypad 102, the fingerprint scanner 104, the iris scanner 106, and the display 110 through a keypad interface 214, a fingerprint scan interface 216, an iris scan interface 218, and a display interface 222, respectively. In addition, the camera 108 may be coupled to the biometric identification and authentication unit 200 through the iris scan interface 218 and/or the facial feature interface 220. Moreover the biometric identification and authentication unit 200 may also comprise a processor 202 and an identification module 204 comprising a plurality of numeric and biometric modules. In the embodiment shown in FIG. 2, the identification module 204 may comprise a numeric identification module 206, a fingerprint module 208, an iris module 210, and a facial feature module 212. In all such embodiments, the components and modules of the automated teller machine 100 may be coupled to one another by one or more high-speed buses (for example, as bus 230).

The biometric identification and authentication unit 200 may also be communicatively coupled to a remote server 228 through a network 226. In one embodiment, the biometric identification and authentication unit 200 may communicate with the network 226 through a network interface controller (NIC) 224. In the embodiment shown in FIG. 2, a user database 232 may reside in the remote server 228. In this embodiment, the remote server 228 may be configured to narrow the user database 232 if the user database 232 is a large database with a significant number of entries. In an alternative embodiment not shown in FIG. 2, the user database 232 may reside in a memory of the identification module 204 of the automated teller machine 100.

In one embodiment, the network 226 may be a wireless network and the automated teller machine 100 may communicate with the remote server 228 via a secure and encrypted wireless network connection. In this embodiment, the wireless network connection may comprise a bi-directional transference of data through at least a portion of a Personal Communication Service (PCS) frequency standard, a Wireless Broadband (WiBro) standard, a Worldwide Interoperability for Microwave Access (WiMAX) standard, a 4GPP Long Term Evolution (LTE) standard, an Ultra Mobile Broadband (UMB) standard, a High Capacity Spatial Division Multiple Access (HC-SDMA) standard, a High Speed OFDM Packet Access (HSOPA), a Generic Access Network (GAN), a Time Division-Code Division Multiple Access (TD-CDMA) standard, a Freedom of Mobile Multimedia Access (FOMA) standard, a Universal Mobile Telecommunications System (UMTS), a Wideband Code Division Multiple Access (W-CDMA) standard, an Enhanced Data Rates for GSM Evolution (EDGE) standard, a Code Division Multiple Access-2000 (CDMA2000) standard, a General Packet Radio Service (GPRS) standard, a Global System for Mobile Communications (GSM) standard, and any other radiofrequency standard that may be used to effect the disclosed embodiments.

In addition, the wireless network connection may comprise a bi-directional transference of data through at least a portion of a wireless wide-area network (WWAN) connection, a satellite network connection, an optical or infrared connection, a near-field communication connection, and a wireless connection abiding by the rules of the Institute of Electrical and Electronics Engineers (IEEE) Standard 802.11.

In another embodiment, the network 226 may be a wired network and the automated teller machine 100 may communicate with the remote server 228 via a secure and encrypted wired network connection. In this embodiment, the wired network connection may comprise the bi-directional transference of data through at least a portion of a local-area network (LAN) connection, a wide-area network (WAN) connection, a cable high-speed connection, and/or a fiber optic connection.

The remote server 228 may be implemented in a number of different forms. In one embodiment, the remote server 228 may be implemented as a standard server and/or a group of such servers. In another embodiment, the remote server 228 may be implemented as part of a rack server system. In yet another embodiment, the remote server 228 may be implemented as a general computing device such as a desktop or laptop computer. Alternatively, the remote server 228 may comprise an entire system general computing devices.

In one or more embodiments, the user database 232 may be a dBase database, an xBase database, an SQL database, a Microsoft® Access® database, an object-oriented database, a hierarchical database, a relational database, or any suitable database management system (DBMS) known to one of ordinary skill in the art. In one or more embodiments, the user database 232 may be stored in a memory of the remote server 228. In these embodiments, all searches and narrowing of the user database 232 may be performed by the remote server 228 if the user database 232 is a large database with a significant number of entries.

Figure 3:
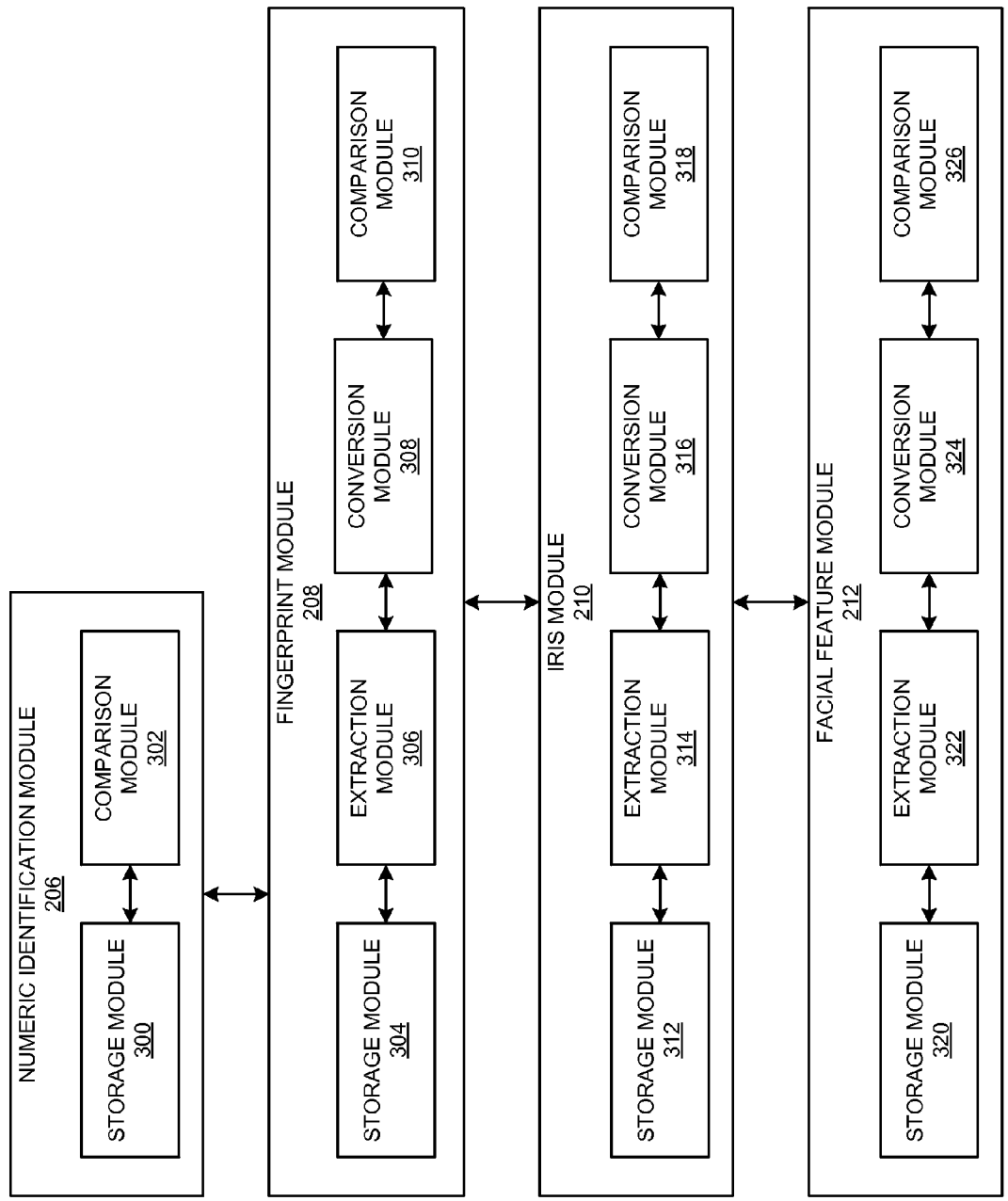
FIG. 3 is a block diagram depicting certain modules of the automated teller machine of FIG. 1, according to one or more embodiments.

Reference is now made to FIG. 3, which is a block diagram depicting a plurality of modules of the automated teller machine of FIG. 1, according to one or more embodiments. As depicted in FIG. 3, the numeric identification module 206 may comprise a storage module 300 and a comparison module 302. In addition, the fingerprint module 208 may comprise a storage module 304, an extraction module 306, a conversion module 308, and a comparison module 310. Moreover, the iris module 210 may comprise a storage module 312, an extraction module 314, a conversion module 316, and a comparison module 318. Furthermore, the facial feature module 212 may comprise a storage module 320, an extraction module 322, a conversion module 324, and a comparison module 326.

In one exemplary embodiment, the processor 202 of the automated teller machine 100 may retrieve a numeric identification data inputted by the user. In one embodiment, the processor 202 may be instructed by the storage module 300 to store the numeric identification data in a memory of the identification module 204. Additionally, the processor 202 or a processor of the remote server 228 may then compare the numeric identification data against a stored set of numeric identification data previously stored in the user database 232. In one embodiment, the comparison module 302 may instruct the processor 202 or a processor of the remote server 228 to perform the comparison according to a matching algorithm. In addition, the processor 202 or a processor of the remote server 228 may be instructed by the comparison module 302 to narrow a user population to a first narrowed set of the user population based on the comparison of the numeric identification data against the stored set of numeric identification data. In this embodiment, if the numeric identification data inputted is not found, the automated teller machine 100 may instruct the user to re-input the numeric identification data. In one embodiment, the numeric identification data may be inputted by the user through the keypad 102. In this and other embodiments, the stored set of numeric identification data may be numeric identification data provided to a financial institution associated with the automated teller machine 100. In one example embodiment, the financial institution may index and store the plurality of user-submitted numeric identification data in the user database 232. In one or more embodiments, the user database 232 may be stored in the remote server 228 if the database is a large database with a significant number of entries.

In one or more embodiments, the numeric identification data may be a zip code of the user, a pin code of the user, and/or a phone number of the user. Additionally, the user population may be a numeric data representing a total number of users of the automated teller machine 100. Such a total number may be pre-determined by the financial institution associated with the automated teller machine 100.

Additionally, the fingerprint scanner 104 may be configured to receive a fingerprint of the user and store a template of the fingerprint in a memory of the identification module 204. In one embodiment, the storage module 304 may direct the processor to store the template of the fingerprint in a particular location in a memory of the identification module 204. In addition, the extraction module 306 may instruct the processor 202 to extract a first set of extracted fingerprint features from the template of the fingerprint. In one or more embodiments, the template of the fingerprint may be a live scan of the fingerprint. Moreover, the first set of extracted fingerprint features may be one of an arch, a loop, or a whorl of the fingerprint. In another embodiment, the first set of extracted fingerprint features may be a global orientation field of the fingerprint. In addition, the conversion module 308 may instruct the processor to convert the first set of extracted fingerprint features to a first digital fingerprint data. In one embodiment, the conversion module 308 may instruct an analog-to-digital converter coupled to the fingerprint scanner 104 to convert the first set of extracted fingerprint features to a first digital fingerprint data. In addition, the comparison module 310 may instruct the processor 202 or a processor of the remote server 228 to narrow the user population from the first narrowed set to a second narrowed set based on a comparison of the first digital fingerprint data to a stored set of digital fingerprint data stored in the user database 232. In one embodiment, the comparison module 310 undertakes this comparison by instructing the processor 202 or a processor of the remote server 228 to align the first digital fingerprint data with the stored set of digital fingerprint data using the orientation of the first set of extracted fingerprint features. Moreover, the comparison module 310 may apply a median filter to both the first digital fingerprint data and the stored set of digital fingerprint data prior to the comparison.

In addition, the extraction module 306 may instruct the processor 202 to extract a second set of extracted fingerprint features from the template of the fingerprint and the conversion module 308 may convert the second set of extracted fingerprint features to a second digital fingerprint data. In one or more embodiments, the second set of extracted fingerprint features may be a local Minutia or a specific Minutia pattern of the fingerprint. The conversion module 308 may be configured to instruct the processor 202 to extract the second set of extracted fingerprint features from the template of the fingerprint. Furthermore, the comparison module 310 may instruct the processor to narrow the user population from the second narrowed set to a third narrowed set based on a comparison of the second digital fingerprint data to the stored set of digital fingerprint data. In one embodiment, the singularities and Minutia cues of the second set of extracted fingerprint features may be used for the comparison. It should be understood by one of ordinary skill in the art of biometrics that any commonly available comparison techniques including, but not limited to, Poincare indexing may be used for the comparison. In these and other embodiments, the stored set of digital fingerprint data in the user database may be a plurality of user-submitted digital fingerprint data indexed and stored in the user database 232 by the financial institution associated with the automated teller machine 100.

Also in this exemplary embodiment, the iris scanner 106 may be configured to scan an iris image of the user and the processor 202 of the automated teller machine 100 may store a template of the iris image in a memory of the identification module 204. In one embodiment, the storage module 312 may instruct the processor to store the template of the iris image in a particular location in a memory of the identification module 204. In addition, the extraction module 314 may instruct the processor 202 to extract a first set of extracted iris features from the template of the iris image. In one or more embodiments, the template of the iris image may be an image of the chromatic pattern of the iris of the user. In addition, the first set of extracted iris features may be a chromatic pattern of the stroma of the iris of the user. In another embodiment, the first set of extracted iris features may be a light-density pattern of the iris of the user. In addition, the conversion module 316 may instruct the processor 202 to convert the first set of extracted iris features to a first digital iris data. In addition, the comparison module 318 may instruct the processor 202 or a processor of the remote server 228 to narrow the user population from the third narrowed set to a fourth narrowed set based on a comparison of the first digital iris data to a stored set of digital iris data stored in the user database 232. In one embodiment, the comparison module 318 undertakes this comparison by instructing the processor 202 to align the first digital iris data to the stored set digital iris data using the orientation of the first set of extracted iris features.

Furthermore, the extraction module 314 may instruct the processor 202 to extract a second set of extracted iris features from the template of the iris image and the conversion module 316 may instruct the processor 202 to convert the second set of extracted iris features to a second digital iris data. In this embodiment, the second set of extracted iris features may be a chromatic pattern of the epithelial layer of the iris. In addition, the comparison module 318 may instruct the processor 202 or a processor of the remote server 228 to narrow the user population from the fourth narrowed set to a fifth narrowed set based on a comparison of the second digital iris data to the stored set of digital iris data. In one or more embodiments, the stored set of digital iris data in the user database may be a plurality of user-submitted digital iris data indexed and stored in the user database 232 by the financial institution associated with the automated teller machine 100. In one or more embodiments, the camera 108 may be used to capture the iris image of the user.

In addition, the camera 108 may capture a facial image of the user and the storage module 320 may instruct the processor 202 to store a template of the facial image in a particular location in a memory of the identification module 204. In addition, the extraction module 322 may instruct the processor 202 to extract a first set of extracted facial features from the template of the facial image. In one or more embodiments, the template of the facial image may be a digital image of the face of the user. In these and other embodiments, the first set of extracted facial features may be a set of dimensions of the face of the user. In addition, the conversion module 324 may convert the first set of extracted facial features to a first digital facial data. In one or more embodiments, the first digital facial data may comprise a numeric data that correlates to distances between pre-determined boundary points on the user's facial image. Moreover, the comparison module 326 may narrow the user population from the fifth narrowed set to a sixth narrowed set based on a comparison of the first digital facial data to a stored set of digital facial data stored in the user database.

Furthermore, the extraction module 322 may instruct the processor to extract a second set of extracted facial features from the template of the facial image. In one or more embodiments, the second set of extracted facial features may be a set of distances from pre-determined reference points to a center point on the face of the user. In this embodiment, the conversion module 324 may then instruct the processor 202 to convert the second set of extracted facial features to a second digital facial data. The comparison module 326 may then instruct the processor 202 or a processor of the remote server 228 to narrow the user population from the sixth narrowed set to a seventh narrowed set based on a comparison of the second digital facial data to the stored set of digital facial data. Finally, the biometric identification and authentication unit 200 may authenticate the user and permit the user to access a financial account of the user through the automated teller machine 100 based on the final comparison of the second digital facial data to the stored set of digital facial data.

Figure 4A:
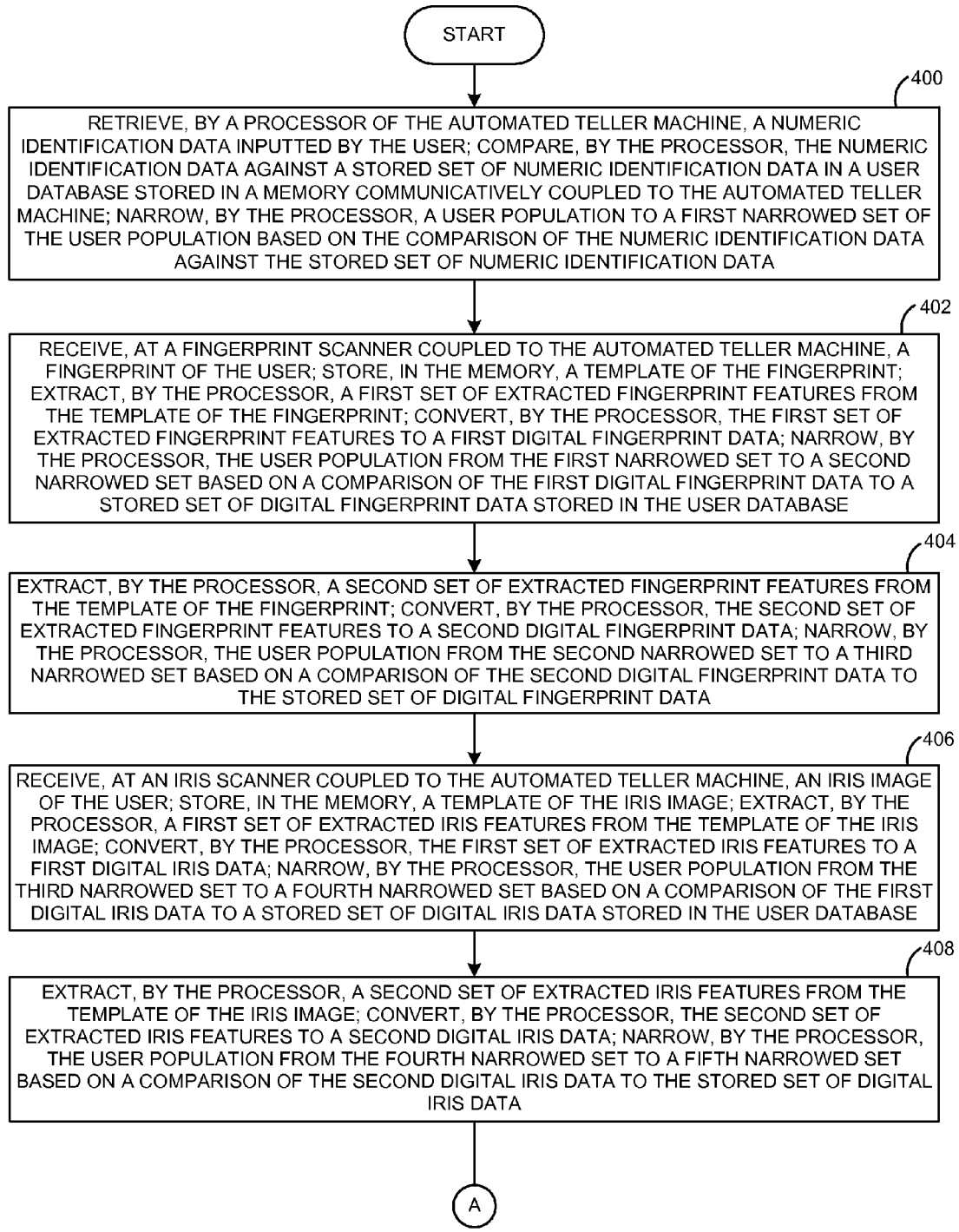
FIGS. 4A and 4B are simplified process flow diagrams illustrating an exemplary method of the disclosure, according to one or more embodiments.
Figure 4B:
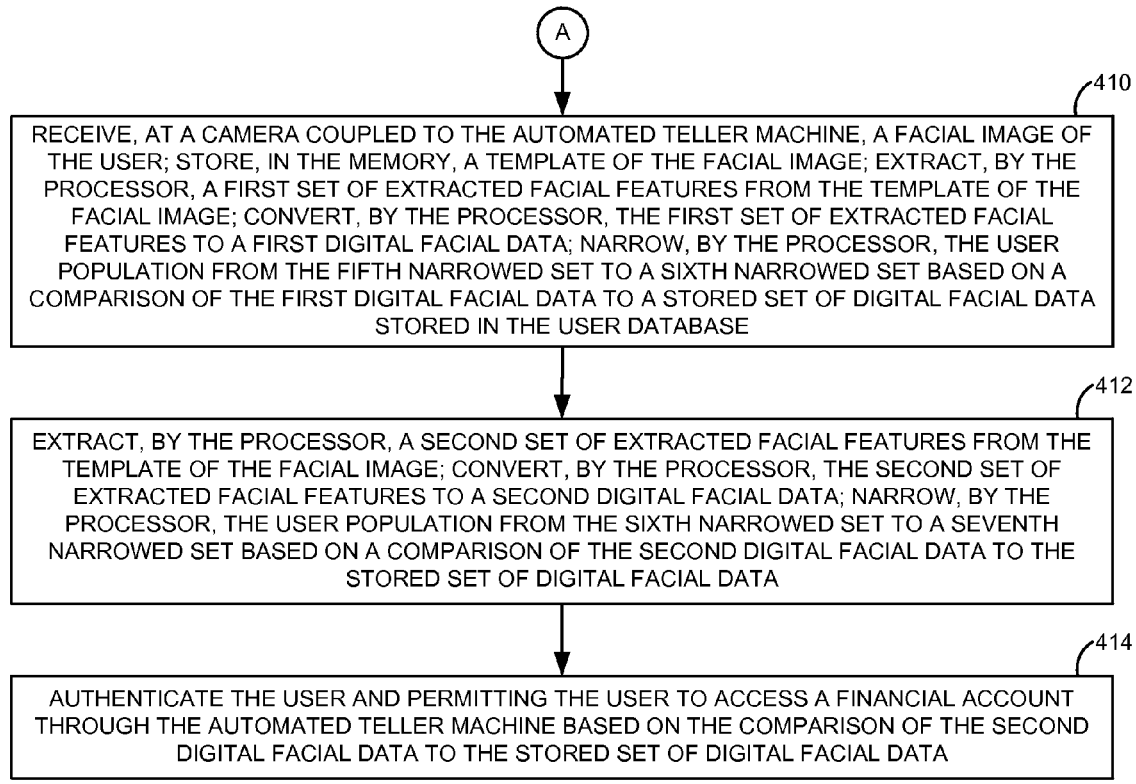

Reference is now made to FIGS. 4A and 4B, which are a simplified process flow diagrams illustrating an exemplary method of biometric identification and authentication, according to one or more embodiments. Specifically, operation 400 may involve retrieving, by a processor of the automated teller machine, a numeric identification data inputted by the user; comparing, by the processor, the numeric identification data against a stored set of numeric identification data in a user database stored in a memory communicatively coupled to the automated teller machine; and narrowing, by the processor, a user population to a first narrowed set of the user population based on the comparison of the numeric identification data against the stored set of numeric identification data.

According to one or more embodiments, operation 402 may involve receiving, at a fingerprint scanner coupled to the automated teller machine, a fingerprint of the user; storing, in the memory, a template of the fingerprint; extracting, by the processor, a first set of extracted fingerprint features from the template of the fingerprint; converting, by the processor, the first set of extracted fingerprint features to a first digital fingerprint data; and narrowing, by the processor, the user population from the first narrowed set to a second narrowed set based on a comparison of the first digital fingerprint data to a stored set of digital fingerprint data stored in the user database.

According to one or more embodiments, operation 404 may involve extracting, by the processor, a second set of extracted fingerprint features from the template of the fingerprint; converting, by the processor, the second set of extracted fingerprint features to a second digital fingerprint data; and narrowing, by the processor, the user population from the second narrowed set to a third narrowed set based on a comparison of the second digital fingerprint data to the stored set of digital fingerprint data.

According to one or more embodiments, operation 406 may involve receiving, at an iris scanner coupled to the automated teller machine, an iris image of the user; storing, in the memory, a template of the iris image; extracting, by the processor, a first set of extracted iris features from the template of the iris image; converting, by the processor, the first set of extracted iris features to a first digital iris data; and narrowing, by the processor, the user population from the third narrowed set to a fourth narrowed set based on a comparison of the first digital iris data to a stored set of digital iris data stored in the user database.

According to one or more embodiments, operation 408 may involve extracting, by the processor, a second set of extracted iris features from the template of the iris image; converting, by the processor, the second set of extracted iris features to a second digital iris data; and narrowing, by the processor, the user population from the fourth narrowed set to a fifth narrowed set based on a comparison of the second digital iris data to the stored set of digital iris data.

According to one or more embodiments, operation 410 may involve receiving, at a camera coupled to the automated teller machine, a facial image of the user; storing, in the memory, a template of the facial image; extracting, by the processor, a first set of extracted facial features from the template of the facial image; converting, by the processor, the first set of extracted facial features to a first digital facial data; and narrowing, by the processor, the user population from the fifth narrowed set to a sixth narrowed set based on a comparison of the first digital facial data to a stored set of digital facial data stored in the user database.

According to one or more embodiments, operation 412 may involve extracting, by the processor, a second set of extracted facial features from the template of the facial image; converting, by the processor, the second set of extracted facial features to a second digital facial data; and narrowing, by the processor, the user population from the sixth narrowed set to a seventh narrowed set based on a comparison of the second digital facial data to the stored set of digital facial data. According to one or more embodiments, operation 414 may involve authenticating the user and permitting the user to access a financial account through the automated teller machine based on the comparison of the second digital facial data to the stored set of digital facial data.

In one or more embodiments, if the user population is not narrowed as a result of a failed comparison of a biometric feature of the user, the automated teller machine 100 may default to the next biometric identification and authentication technique.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method A method to authenticate a user at an automated teller machine (ATM), the method comprising:

receiving by a processor of the ATM communicatively coupled to a memory, numeric data identifying the user but unexclusive thereto;

comparing by at least one of: the processor of the ATM and a processor of a remote server communicatively coupled to the ATM, the received numeric data with stored numeric data in a database associated with the remote server;

narrowing by the at least one of: the processor of the ATM and the processor of the remote server, a search space within the database associated with the remote server based on the comparison of the received numeric data into a first search space, the first search space comprising a plurality of users identified by the numeric data received from the user, and the plurality of users including the user providing the numeric data;

receiving by the processor of the ATM, biometric identification data of the user from at least one of: a fingerprint scanner, an iris scanner and a camera communicatively coupled to the processor of the ATM following the narrowing of the search space into the first search space;

extracting by the processor of the ATM, a partial biometric identifier of the user from the received biometric identification data in a first operation;

comparing by the at least one of: the processor of the ATM and the remote server, the extracted partial biometric identifier of the user with stored biometric identification data in the database associated with the remote server in the first operation;

narrowing by the at least one of: the processor of the ATM and the processor of the remote server, the first search space into a second search space based on the comparison of the extracted partial biometric identifier of the user in the first operation;

extracting by the processor of the ATM, a second biometric identifier of the user from the received biometric identification data in at least one second operation temporally succeeding the first operation, the extracted second biometric identifier being a more unique identifier of the user than the extracted partial biometric identifier thereof;

comparing by the at least one of: the processor of the ATM and the remote server, the extracted second biometric identifier of the user with the stored biometric identification data in the database associated with the remote server in the at least one second operation;

narrowing by the at least one of: the processor of the ATM and the processor of the remote server, the second search space into a third search space based on the comparison of the extracted second biometric identifier of the user in the at least one second operation; and providing by the processor of the ATM, the user access to financial account information unique thereto only when the third search space solely includes the user providing the biometric identification data and the numeric data.

2. The method of claim 1, wherein the numeric data received from the user is at least one of: a zip code of the user and a pin code of the user.

3. The method of claim 1, comprising receiving at least one of:
fingerprint data, iris data and facial scan data of the user as the biometric identification data thereof.

4. The method of claim 3, comprising at least one of:
capturing a scan of a fingerprint of the user through the fingerprint scanner communicatively coupled to the processor of the ATM as the fingerprint data;

capturing a scan of an iris of the user through the iris scanner communicatively coupled to the processor of the ATM as the iris data; and capturing an image of a face of the user through the camera communicatively coupled to the processor of the ATM as the facial scan data.

5. The method of claim 4, wherein:
the extracted partial biometric identifier with respect to the fingerprint data is at least one of:
an arch, a loop and a whorl of the fingerprint, and
the extracted second biometric identifier with respect to the fingerprint data is at least one of: a pattern and a minutia feature of the fingerprint.

6. The method of claim 4, wherein:
the extracted partial biometric identifier with respect to the iris data is a chromatic pattern of a stroma of the iris, and
the extracted second biometric identifier with respect to the iris data is a chromatic pattern of the epithelial layer of the iris.

7. The method of claim 4, wherein:
the extracted partial biometric identifier with respect to the facial scan data is a set of dimensions of the face of the user, and
the extracted second biometric identifier with respect to the facial scan data is a set of distances from predetermined reference points to a center point on the face of the user.

8. A non-transitory medium, readable through at least one of an ATM and a remote server communicatively coupled to the ATM and comprising instructions related to authenticating a user at the ATM embodied that when executed, cause the at least one of the ATM and the remote server to perform the steps of:

receiving numeric data identifying the user but unexclusive thereto;

comparing the received numeric data with stored numeric data in a database associated with the remote server;

narrowing a search space within the database associated with the remote server based on the comparison of the received numeric data into a first search space, the first search space comprising a plurality of users identified by the numeric data received from the user, and the plurality of users including the user providing the numeric data;

receiving biometric identification data of the user from at least one of: a fingerprint scanner, an iris scanner and a camera communicatively coupled to the processor of the ATM following the narrowing of the search space into the first search space;

extracting a partial biometric identifier of the user from the received biometric identification data in a first operation;

comparing the extracted partial biometric identifier of the user with stored biometric identification data in the database associated with the remote server in the first operation;

narrowing the first search space into a second search space based on the comparison of the extracted partial biometric identifier of the user in the first operation;

extracting a second biometric identifier of the user from the received biometric identification data in at least one second operation temporally succeeding the first operation, the extracted second biometric identifier being a more unique identifier of the user than the extracted partial biometric identifier thereof;

comparing the extracted second biometric identifier of the user with the stored biometric identification data in the database associated with the remote server in the at least one second operation;

narrowing the second search space into a third search space based on the comparison of the extracted second biometric identifier of the user in the at least one second operation; and providing the user access to financial account information unique thereto only when the third search space solely includes the user providing the biometric identification data and the numeric data.

9. The non-transitory medium of claim 8, further comprising instructions that when executed, caused the at least one of the ATM and the remote server to perform the step of: receiving at least one of: a zip code of the user and a pin code of the user as the numeric data from the user.

10. The non-transitory medium of claim 8, further comprising instructions that when executed, caused the at least one of the ATM and the remote server to perform the step of: receiving at least one of: fingerprint data, iris data and facial scan data of the user as the biometric identification data thereof.

11. The non-transitory medium of claim 10, further comprising at least one of: instructions that when executed, caused the at least one of the ATM and the remote server to perform the step of: capturing a scan of a fingerprint of the user through the fingerprint scanner communicatively coupled to the processor of the ATM as the fingerprint data; capturing a scan of an iris of the user through the iris scanner communicatively coupled to the processor of the ATM as the iris data; and capturing an image of a face of the user through the camera communicatively coupled to the processor of the ATM as the facial scan data.

12. The non-transitory medium of claim 11, further comprising instructions that when executed, caused the at least one of the ATM and the remote server to perform the step of: extracting: at least one of: an arch, a loop and a whorl of the fingerprint as the partial biometric identifier; and at least one of: a pattern and a minutia feature of the fingerprint as the second biometric identifier.

13. The non-transitory medium of claim 11, further comprising instructions that when executed, caused the at least one of the ATM and the remote server to perform the step of: extracting: a chromatic pattern of a stroma of the iris as the partial biometric identifier, and a chromatic pattern of an epithelial layer of the iris as the second biometric identifier.

14. The non-transitory medium of claim 11, further comprising instructions that when executed, caused the at least one of the ATM and the remote server to perform the step of: extracting: a set of dimensions of the face of the user as the partial biometric identifier, and a set of distances from predetermined reference points to a center point on the face of the user as the second biometric identifier.

15. An ATM configured to authenticate a user, comprising:
a memory; and
a processor communicatively coupled to the memory, the memory storing instructions that, when executed, cause the processor to perform the steps of:
receiving numeric data identifying the user but unexclusive thereto,
comparing the received numeric data with stored numeric data in a database associated with a remote server communicatively coupled to the ATM,
narrowing a search space within the database associated with the remote server based on the comparison of the received numeric data into a first search space, the first search space comprising a plurality of users identified by the numeric data received from the user, and the plurality of users including the user providing the numeric data,
receiving biometric identification data of the user from at least one of: a fingerprint scanner, an iris scanner and a camera communicatively coupled to the processor of the ATM following the narrowing of the search space into the first search space,
extracting a partial biometric identifier of the user from the received biometric identification data in a first operation,
comparing the extracted partial biometric identifier of the user with stored biometric identification data in the database associated with the remote server in the first operation,
narrowing the first search space into a second search space based on the comparison of the extracted partial biometric identifier of the user in the first operation,
extracting a second biometric identifier of the user from the received biometric identification data in at least one second operation temporally succeeding the first operation, the extracted second biometric identifier being a more unique identifier of the user than the extracted partial biometric identifier thereof,
comparing the extracted second biometric identifier of the user with the stored biometric identification data in the database associated with the remote server in the at least one second operation,
narrowing the second search space into a third search space based on the comparison of the extracted second biometric identifier of the user in the at least one second operation, and
providing the user access to financial account information unique thereto only when the third search space solely includes the user providing the biometric identification data and the numeric data.

16. The ATM of claim 15, wherein the numeric data received from the user is at least one of: a zip code of the user and a pin code of the user.

17. The ATM of claim 15, the memory store further instructions that, when executed, cause the processor to perform the step of: receiving at least one of: fingerprint data, iris data and facial scan data of the user as the biometric identification data thereof.

18. The ATM of claim 17, wherein
the extracted partial biometric identifier with respect to the facial scan data is a set of dimensions of the face of the user, and
the extracted second biometric identifier with respect to the facial scan data is a set of distances from predetermined reference points to a center point on the face of the user.

19. The ATM of claim 18, wherein:
the extracted partial biometric identifier with respect to the fingerprint data is at least one of: an arch, a loop and a whorl of the fingerprint, and the extracted second biometric identifier with respect to the fingerprint data is at least one of: a pattern and a minutia feature of the fingerprint.

20. The ATM of claim 18, wherein:
the extracted partial biometric identifier with respect to the iris data is a chromatic pattern of a stroma of the iris, and
the extracted second biometric identifier with respect to the iris data is a chromatic pattern of an epithelial layer of the iris.

* * * * *